United States Patent
Ekanayake et al.

(10) Patent No.: US 9,556,798 B2
(45) Date of Patent: Jan. 31, 2017

(54) SYSTEMS AND METHODS FOR MEASURING A FLOW PROFILE IN A TURBINE ENGINE FLOW PATH

(71) Applicant: General Electric Company, Schenectady, NY (US)

(72) Inventors: Sanji Ekanayake, Mableton, GA (US); Thomas C. Billheimer, Atlanta, GA (US); Douglas Corbin Warwick, Roswell, GA (US); Alston Ilford Scipio, Mableton, GA (US); Dale J. Davis, Greenville, SC (US); Jason Nathaniel Cook, Simpsonville, SC (US); Vahid Vaezi, Greer, SC (US)

(73) Assignee: General Electric Company, Schenectady, NY (US)

( * ) Notice: Subject to any disclaimer, the term of this patent is extended or adjusted under 35 U.S.C. 154(b) by 941 days.

(21) Appl. No.: 13/751,719

(22) Filed: Jan. 28, 2013

(65) Prior Publication Data
US 2014/0208764 A1    Jul. 31, 2014

(51) Int. Cl.
| | |
|---|---|
| F02C 9/16 | (2006.01) |
| G01F 1/69 | (2006.01) |
| F01D 17/00 | (2006.01) |
| F02C 9/00 | (2006.01) |
| G01F 1/684 | (2006.01) |
| G01F 1/696 | (2006.01) |
| G01F 1/74 | (2006.01) |

(52) U.S. Cl.
CPC ............... *F02C 9/16* (2013.01); *F01D 17/00* (2013.01); *F02C 9/00* (2013.01); *G01F 1/684* (2013.01); *G01F 1/69* (2013.01); *G01F 1/6965* (2013.01); *G01F 1/74* (2013.01); *F05D 2260/80* (2013.01); *F05D 2260/81* (2013.01); *F05D 2270/3061* (2013.01); *F05D 2270/3062* (2013.01)

(58) Field of Classification Search
CPC ......... F02C 9/00; F02C 9/28; F05D 2270/306; F05D 2270/3061; F05D 2270/3062
See application file for complete search history.

(56) References Cited

U.S. PATENT DOCUMENTS

| | | | | |
|---|---|---|---|---|
| 4,320,650 | A * | 3/1982 | Kita | G01F 1/3272 73/195 |
| 5,817,932 | A * | 10/1998 | Nishimura | G01F 1/69 73/114.34 |
| 2006/0272333 | A1 * | 12/2006 | Sundin | F01D 17/162 60/776 |

\* cited by examiner

*Primary Examiner* — Patrick Hamo
(74) *Attorney, Agent, or Firm* — Ernest G. Cusick; Frank A. Landgraff

(57) ABSTRACT

A method and system for measuring a flow profile in a portion of a flow path in a turbine engine is provided. The system includes a mass flow sensor assembly having a plurality of hot wire mass flow sensors, the mass flow sensor assembly disposed in the portion of the flow path at a location where the flow profile is to be measured. The system also includes a controller that converts signals from the temperature sensor, the pressure sensor and the plurality of hot wire mass flow sensors to flow profile measurements.

18 Claims, 8 Drawing Sheets

SYSTEMS AND METHODS FOR MEASURING A FLOW PROFILE IN A TURBINE ENGINE FLOW PATH

TECHNICAL FIELD

The subject matter disclosed herein generally relates to instrumentation for turbine engines and more particularly to flow sensors for measuring a flow profile in a turbine engine flow path.

BACKGROUND

Control systems for modern turbine engines measure internal conditions at various positions within the air and the gas flow paths through the turbine engine. Air pressure and temperature measurements may be made through the use of Pitot tubes, thermocouples, and other devices positioned within the compressor and elsewhere. In the absence of suitable hardware, the sensors may be slotted into the compressor or other location on rakes. Rakes are generally mounted onto a machined surface within the compressor and elsewhere.

Currently, compressor inlet volumetric flow measurements are taken using static pressure together with differential pressure measurements in the inlet bellmouth of the turbine engine during continual operation. Compressor inlet mass flow calculation from a volumetric flow measurement additionally requires inlet air density derived from the inlet air temperature and relative humidity measurements combined. This method works reasonably well at full load, where the airflow rate is high and fairly stable, but the accuracy of this approach diminishes as the airflow rate is reduced. Below full speed no load, for example, the current method for measuring airflow is known to be inaccurate and is highly variable. In addition each measurement type has an associated measurement uncertainty, resulting in potentially higher uncertainty than a single measurement. Due to this high variability it is difficult to obtain an accurate understanding of compressor airflow and therefore the utilization of compressor inlet airflow for turbine engine control presents control and diagnostics issues.

Currently, exhaust velocity profiles are measured by utilizing exhaust temperature and total pressure rakes which traverse the exhaust duct. These measurements are then utilized to calculate the exhaust velocity profile utilizing physics based equations. This method works reasonably well for validation testing purposes and is currently applied for the validation of turbine aerodynamic design changes which impact the exhaust flow velocity profile. However, this method requires the installation of two separate sets of rakes increasing the probability of instrument failure during testing. In addition each measurement type has an associated measurement uncertainty, resulting in potentially higher uncertainty than a single measurement. Other than validation testing for the purpose of validating new turbine aerodynamic airfoil shapes the measurement of exhaust velocity and or mass flow profiles is currently not standard within the industry.

Compressor extraction flow measurements for non-modulated turbine engine systems are typically calculated by measuring the temperature and pressure drop across an orifice plate. This method works reasonably well at full load, where the airflow rate through the extraction system is high and fairly stable. However, the accuracy of this method diminishes at lower airflow rates, for which the orifice is over sized, resulting in increased inaccuracy at low loads or low flow levels. In addition the presence of a fixed orifice size in the extraction system limits the functionality of a modulated extraction flow system since at higher flow rates the simple orifice will be the flow limiting component in the extraction flow system.

Accordingly, there is a need for instrumentation for the measurement of exhaust gas velocity profiles to provide a means of validation and calibration of turbine aerodynamic models, and to validate the mixing of exhaust cooling mechanisms. Additionally there is a need for instrumentation for the measurement of turbine engine compressor inlet flow mass flow profiles to enable the validation of the mixing of inlet conditioning measures. There is also a need for instrumentation to accurately measure flow density through a compressor extraction conduit to provide the ability to actively control the level of compressor extraction mass flow rate.

BRIEF DESCRIPTION OF THE INVENTION

The disclosure provides a method for accurately measuring turbine engine inlet mass flow rates, exhaust mass flow rates and extraction mass flow rates.

In accordance with one exemplary non-limiting embodiment, the invention relates to a system for measuring a gas mass flow in a portion of a flow path in a turbine engine. The system includes a mass flow sensor assembly having a plurality of hot wire mass flow sensors. The mass flow sensor assembly is disposed in the portion of the flow path at a location where the flow profile is to be measured. The system also includes a controller that converts signals from the plurality of hot wire mass flow sensors to mass flow measurements.

In another embodiment, a method for measuring a flow profile in a portion of a flow path of a turbine engine is provided. The method further includes sensing a physical change in a plurality of wires disposed in the portion of the flow path of the turbine engine, the physical change being related to a flow attribute at each of a plurality of locations in the portion of the flow path. The method further includes converting signals from the plurality of wires into a flow profile measurement.

In another embodiment, a turbine engine is provided. The turbine engine includes a compressor, a combustor, and a turbine. The compressor, the combustor and the turbine define a flow path and a mass flow sensor assembly is disposed in the flow path. The mass flow sensor assembly is provided with a plurality of hot wire mass flow sensors. The turbine engine further includes a controller that converts signals from the plurality of hot wire mass flow sensors to flow profile measurements.

BRIEF DESCRIPTION OF THE DRAWINGS

Other features and advantages of the present invention will be apparent from the following more detailed description of the preferred embodiment, taken in conjunction with the accompanying drawings which illustrate, by way of example, the principles of certain aspects of the invention.

DETAILED DESCRIPTION OF THE INVENTION

Embodiments of the present invention provide for the direct measurement of flow profiles in a turbine engine system. In one embodiment the flow profile at the inlet plenum of a compressor is measured using a rake with a plurality of hot wire mass flow sensors. In another embodiment, the flow profile at the inlet plenum of a compressor may be measured with a plurality of radially positioned hot wire mass flow sensors. The flow profile may be used to operate the turbine engine system by controlling the mass flow of the compressor. In another embodiment, the flow profile at the exhaust inlet to a turbine may be measured with a rake having a plurality of hot wire mass flow sensors. The exhaust flow profile may be used to operate the turbine engine system based on calculated fuel mass flow rate derived from the measured exhaust flow profile. In another embodiment, the flow profile at a compressor extraction conduit may be measured with a grid of hot wire mass flow sensors. The measured flow profile may be used to operate the turbine engine system based on calculated extraction mass flow.

Figure 1:
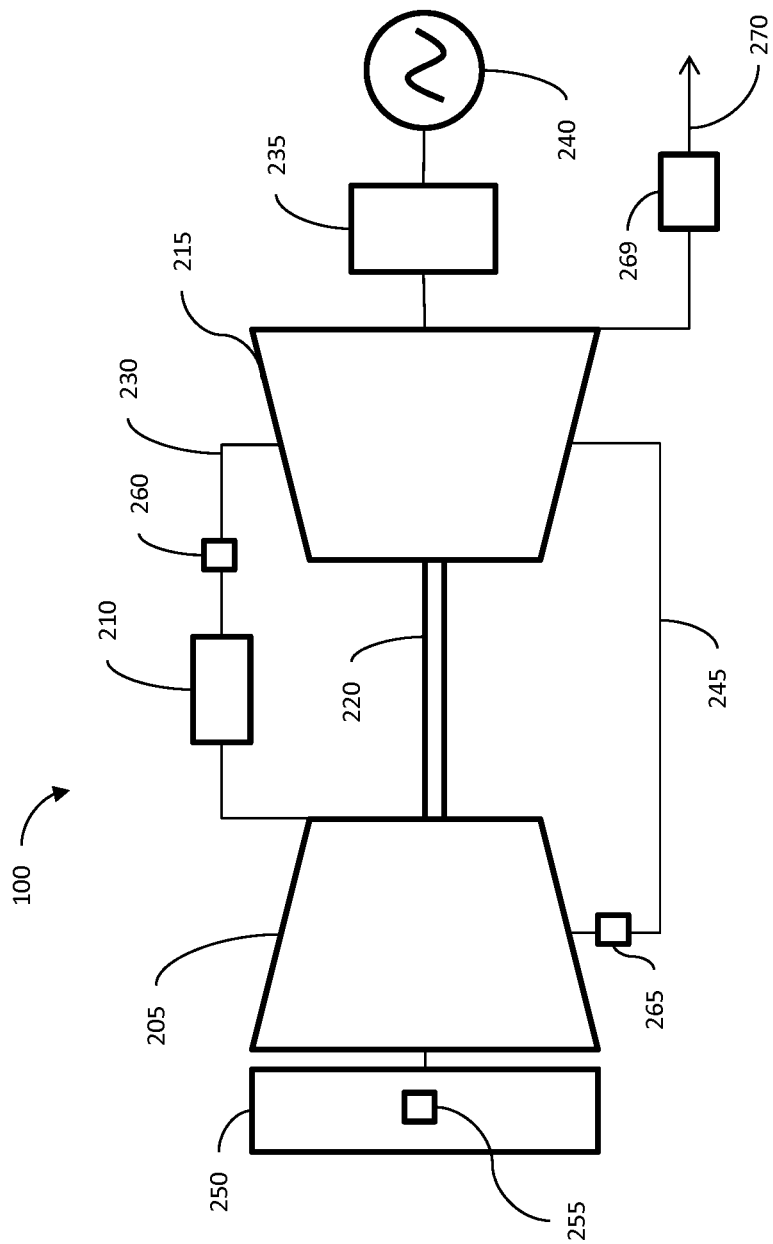
FIG. 1 is a schematic illustration of an exemplary turbine engine system with flow profile measurement systems.

FIG. 1 illustrates a schematic view of an example turbine engine system 100 in accordance with an embodiment of the invention. The turbine engine system 100 includes a compressor 205, a combustor 210 and a turbine 215. Turbine 215 is coupled to a shaft 220 connecting the compressor 205 and turbine 215. In the embodiment shown in FIG. 1, the compressor 205 compresses and discharges gas, and the combustor 210 receives the compressed gas to initiate a combustion process. Combustion gases from the combustor 210 are conveyed through a turbine nozzle 230 to drive the turbine 215, which turns the shaft 220 to drive a generator 235. The generator 235, in turn, generates power for output to an electric grid 240. In the embodiment shown in FIG. 1, air from the compressor 205 can be extracted from one or more stages associated with the compressor 205 through an extraction conduit 245 and can be conveyed to one or more portions of the turbine 215, where the air can cool relatively hot gas path components associated with the turbine 215. The turbine engine system 100 may also include an inlet plenum 250 coupled to the compressor 205. An inlet plenum flow profile measurement system 255 may be coupled to the inlet plenum 250. An combustor exhaust gas flow profile measurement system 260 may be coupled to the turbine nozzle 230. An extraction flow profile measurement system 265 may also be disposed in the extraction conduit 245. A turbine exhaust flow profile measurement system 269 may be disposed in the turbine exhaust duct 270. The inlet plenum 250, the extraction conduit 245, the turbine nozzle 230 and the turbine exhaust duct 270, define flow paths through which gasses with specific flow profiles are conveyed.

Figure 2:
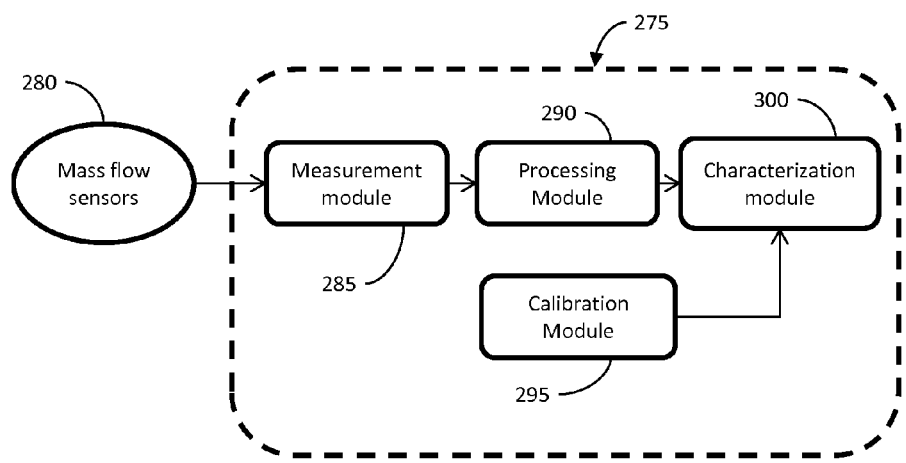
FIG. 2 is a schematic diagram of an exemplary flow profile measurement system.

FIG. 2 is a schematic diagram of an embodiment of a flow profile measurement system 275 which may be utilized to measure the mass flow profile and the velocity flow profile in a flow path. The flow profile measurement system 275 may be implemented as an inlet plenum flow profile measurement system 255 (disposed in the compressor inlet flow path), an exhaust gas flow profile measurement system 260 (disposed in the exhaust flow path), or an extraction flow profile measurement system 265 (disposed in the extraction flow path). The flow profile measurement system 275 receives inputs (mass flow profile measurements, or velocity flow profile measurements) from a plurality of mass flow sensors 280. The flow profile measurement system 275 includes a measurement module 285, a processing module 290, a calibration module 295 and a characterization module 300. The function of the measurement module 285 is to aggregate the plurality of mass flow sensor measurements. The function of the processing module 290 is to filter and condition the aggregated mass flow measurements. The function of the calibration module is to provide calibration data that can be applied by the characterization module 300. The characterization module 300 characterizes the data and provides a flow profile output. The inputs from the plurality of mass flow sensors 280 are communicated to the measurement module 285 which in turn conveys the measured sensor values to the processing module 290. The processing module 290 utilizes model based controls and signal filtration techniques such as Kalman filters to process measured current. The model-based controls are derived from a predictive model of the thermodynamic response of the gas turbine. One approach to modeling is using a numerical process known as system identification. System identification involves acquiring data from a system and then numerically analyzing stimulus and response data to estimate the parameters of the system. The processing module 290 may utilize parameter identification techniques such as Kalman filtering, tracking filtering, regression mapping, neural mapping, inverse modeling techniques, or a combination thereof, to identify shifts in the data. The filtering may be performed by a modified Kalman filter, an extended Kalman filter, or other filtering algorithm, or alternatively, the filtering may be performed by or other forms of square (n-inputs, n-outputs) or non-square (n-input, m-outputs) regulators. The flow profile measurement system 275 also includes a calibration module 295 that provides calibration data to a characterization module 300 that characterizes the flow profile.

Figure 3:
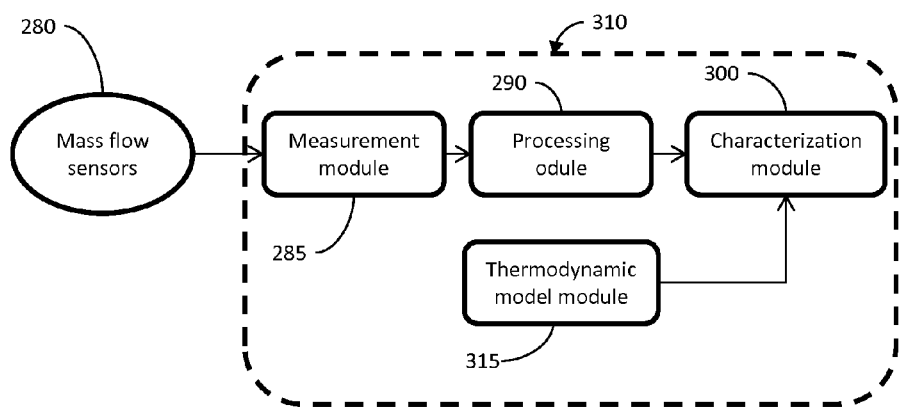
FIG. 3 is a schematic diagram of an exemplary calibration system for a flow profile measurement system.

FIG. 3 is a schematic diagram of an embodiment of a flow profile calibration system 310 for a flow profile measurement system 275. The flow profile calibration system 310 receives inputs from a plurality of mass flow sensors 280. The inputs are received in the measurement module 285 which in turn conveys the measured sensor values to the processing module 290. The flow profile calibration system 310 also includes a thermodynamic model module 315 that provides an input to the characterization module 300. The thermodynamic model module 315 may utilize an adaptive real time engine simulation model that may electronically model, in real time, several operating parameters of turbine engine system 100. The function of the thermodynamic model module is to predict the thermodynamic response of the gas turbine.

Figure 4:
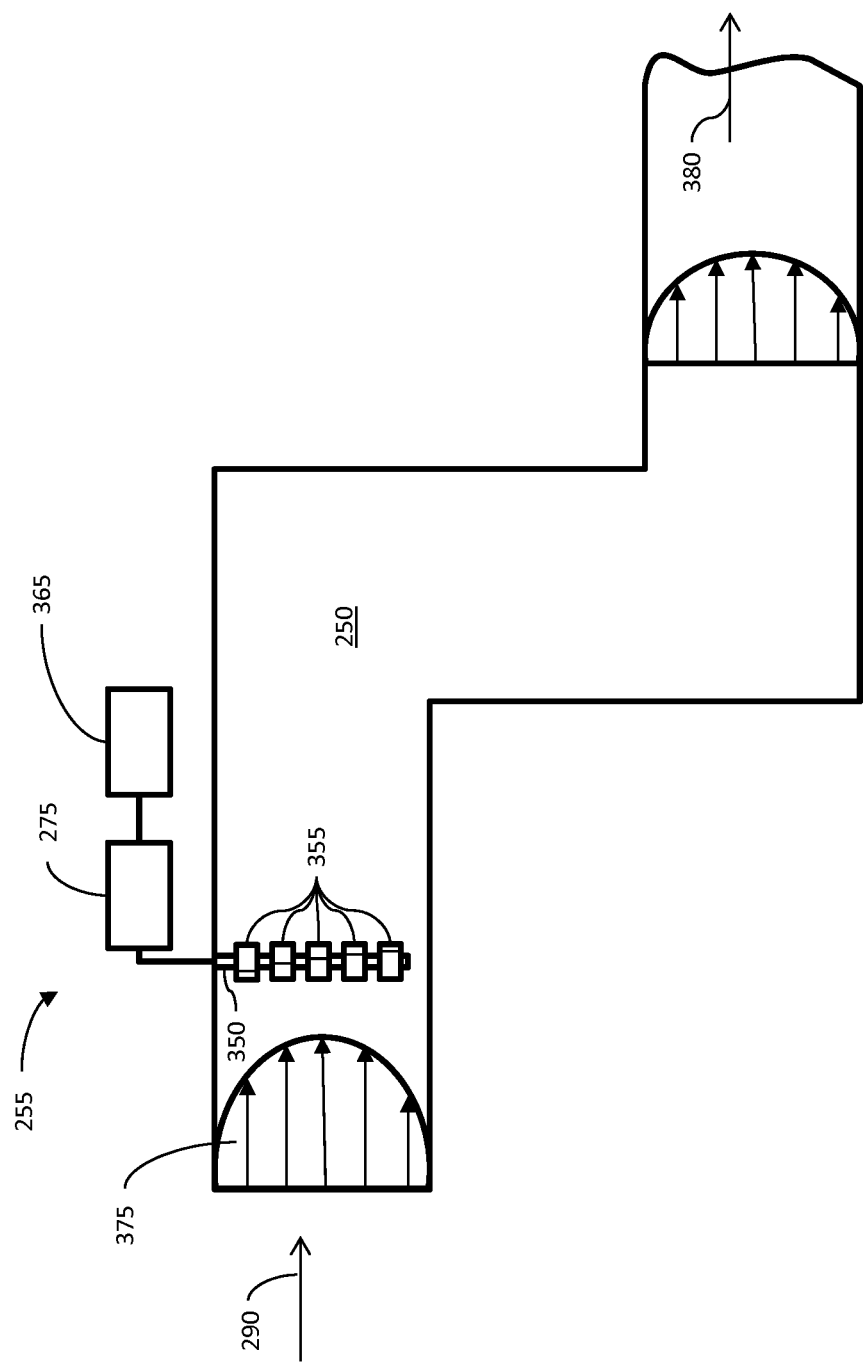
FIG. 4 is a schematic illustration of an embodiment of an inlet plenum flow profile measurement system.

Illustrated in FIG. 4 is an inlet plenum flow profile measurement system 255. The inlet plenum flow profile measurement system 255 includes a mass flow sensor assembly having a rake 350 and a plurality of mass flow sensors such as hot wire mass flow sensors 355 disposed on the rake 350. The rake 350 is configured and positioned to traverse a region of interest, in this case the inlet plenum 250. To traverse the region of interest, the rake 350 may distribute the hot wire mass flow sensors 355 at varying distances along the rake 350. In another embodiment, the flow profile at the inlet plenum 250 of a compressor 205 (shown in FIG. 1) may be measured with a plurality of hot wire mass flow sensors 355 that are positioned radially. The output of the plurality of hot wire mass flow sensors 355 are provided to the flow profile measurement system 275 which may be integrated with or form part of a turbine engine control system 365. Flow into the inlet plenum 250 (represented by arrow 370, the compressor inlet flow path) passes through the plurality of hot wire mass flow sensors 355 where the flow profile 375 is measured and continues to the compressor (represented by arrow 376).

The turbine engine control system 365 may be a conventional General Electric Speedtronic™ Mark VI Gas Turbine Control System. The SpeedTronic controller monitors various sensors and other instruments associated with a turbine engine. In addition to controlling certain turbine functions, such as fuel flow rate, the SpeedTronic controller generates data from its turbine sensors and presents that data for display to the turbine operator. The data may be displayed using software that generates data charts and other data presentations, such as the General Electric Cimplicity™ HMI software product.

The Speedtronic™ control system is a computer system that includes microprocessors that execute programs to control the operation of the turbine engine using sensor inputs and instructions from human operators. The control system includes logic units, such as sample and hold, summation and difference units that may be implemented in software or by hardwire logic circuits. The commands generated by the control system processors cause actuators on the turbine engine to, for example, adjust the fuel control system that supplies fuel to the combustion chamber, set the inlet guide vanes to the compressor, and adjust other control settings on the turbine engine.

The turbine engine control system 365 includes computer processors and data storage that convert the sensor readings to data using various algorithms executed by the processors. The data generated by the algorithms are indicative of various operating conditions of the turbine engine. The data may be presented on operator displays 22, such as a computer work station, that is electronically coupled to the operator display. The display and or controller may generate data displays and data printouts using software, such as the General Electric Cimplicity™ data monitoring and control software application.

Hot wire mass flow sensors 355 determine the mass of air or gas flowing into a system. The theory of operation of the hot wire mass flow sensors 355 is similar to that of the hot wire anemometer (which determines air velocity). The mass flow sensor operates by heating a wire with an electric current that is suspended in the gas stream. The wire's electrical resistance increases as the wire's temperature increases, which limits electrical current flowing through the circuit. When gas flows past the wire, the wire cools, decreasing its resistance, which in turn allows more current to flow through the circuit. As more current flows, the wire's temperature increases until the resistance reaches equilibrium again. The amount of current required to maintain the wire's temperature is proportional to the mass of air flowing past the wire. If air density increases due to pressure increase or temperature drop, but the air volume remains constant, the denser air will remove more heat from the wire indicating a higher mass airflow. Unlike the hot wire anemometer, the hot wire mass flow meter responds directly to air density.

An alternative embodiment utilizes a resistive metal film in the form of a plate, which is aligned parallel to the direction of the flow. The flow facing side of the plate, (i.e. the narrow side) is coated with a heat insulating material such that the resistive metal plate of the mass flow sensor is not impacted by any deposits to the leading edge of the rake. This alternate embodiment reduces the impact of material being deposited on the resistive material and therefore the need for frequent calibration during continuous operation From a performance modeling stand point, the measurement of compressor inlet mass flow rate profiles provides a means of calculating the average compressor inlet mass flow rate. The average compressor inlet mass flow rate can then be communicated to the turbine engine control system 365 for the control of various turbine engine operating modes. An accurate understanding of compressor inlet flow in conjunction with an accurate understanding of turbine engine exhaust conditions can be utilized to set the overall performance level of a turbine engine through a Model Based Control strategy. In addition, accurate understanding of compressor inlet flow can be utilized to more accurately control the fuel/air ratio for the combustion process within a turbine engine, thus allowing for operation in close proximity to combustion limits such as lean blow out.

From a mechanical stand point the measurement of compressor inlet flow velocity and/or mass flow profiles provides the ability to validate the mixing of inlet conditioning measures. An example would be the injection of Inlet Bleed Heat for compressor surge protection. Locating the compressor inlet flow rake(s) downstream of the inlet bleed heat injection port will provide the ability to quantify the amount of inlet bleed heat injected, relative to a basis with no inlet bleed heat, in addition to ability to quantify the mixing of inlet bleed heat within the flow stream prior to injection into the compressor. This methodology could be expanded to quantify the amount and mixing of other inlet conditioning measures such as injection of water vapor for power augmentation, i.e. wet compression, etc.

Figure 5:
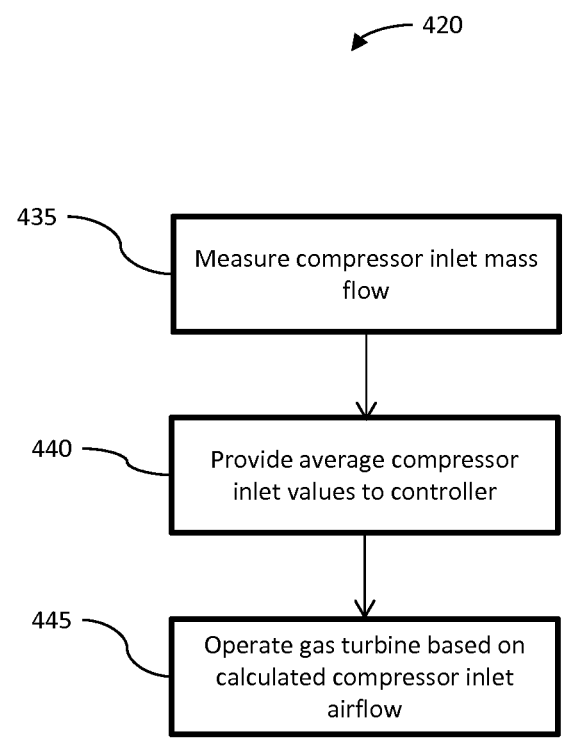
FIG. 5 is a flow diagram of an exemplary method of operating a turbine engine based on a compressor inlet flow profile.

Illustrated in FIG. 5 is a flow chart for a method 420 for operating a turbine engine system based on compressor inlet flow profile.

In step 435 the method 420 measures the compressor inlet mass air flow using the inlet flow mass flow sensors.

In step 440 the method 420 provides the average compressor inlet mass flow value to a turbine engine control system 365.

In step 445 the method 420 operates the turbine engine system based on calculated compressor inlet airflow.

Figure 6:
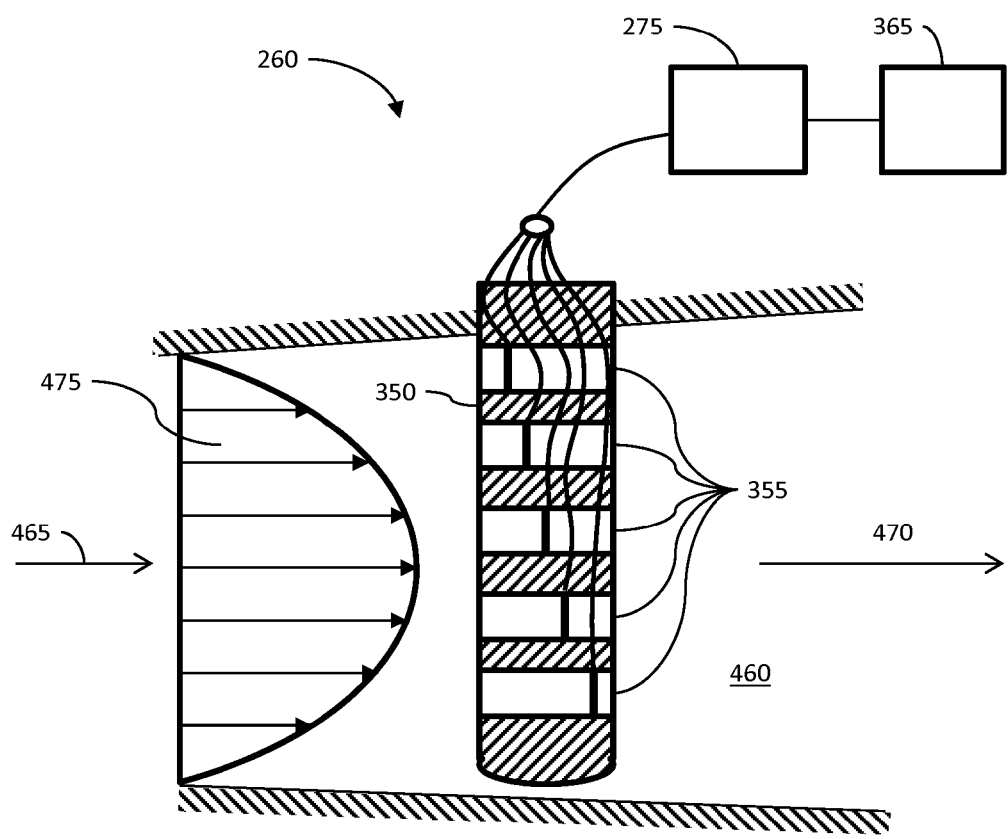
FIG. 6 is a schematic illustration of an embodiment of an exhaust flow profile measurement system.

Illustrated in FIG. 6 is an exhaust gas flow profile measurement system 260. A rake 350 with a plurality of hot wire mass flow sensors 355 is disposed in the exhaust gas path 460. Exhaust gasses (denoted by arrow 465) from the combustor 210 (shown in FIG. 1) flow through the plurality of hot wire mass flow sensors 355 and the exhaust gasses (denoted by arrow 470) and continue to the turbine 215 (shown in FIG. 1). The output of the plurality of hot wire mass flow sensors 355 is communicated to the flow profile measurement system 275 which may be integrated with or form part of a turbine engine control system 365. The plurality of hot wire mass flow sensors 355 measure the exhaust gas flow profile 475. The measurement of exhaust gas velocity and/or mass flow profiles offers numerous benefits with regards to mechanical and performance modeling. From a mechanical stand point the measurement of exhaust gas velocity profiles provides a means of validation and calibration of turbine aerodynamic models. In addition, the measurement of exhaust gas mass flow profiles provides the ability to validate the mixing of exhaust cooling mechanisms, e.g. exhaust frame blower cooling. From a performance modeling stand point the measurement of exhaust gas mass flow rate provides a means of calculating the average exhaust gas mass flow rate. The average exhaust gas mass flow rate can then be utilized to isolate either the compressor inlet air flow rate, fuel flow rate and/or frame blower flow rate, with appropriate understanding of two of the three variables, thus improving overall modeling of the exhaust system. In the case of known compressor inlet flow and frame blower flow the resulting average exhaust gas mass flow rate could be utilized to calculate the fuel mass flow rate into the turbine engine, one of the least accurate measurements in the turbine engine system. This calculated fuel mass flow rate could then be communicated to the turbine engine control system 365 to either control the turbine engine or tune the fuel mass flow being received from the fuel mass flow measuring device.

Figure 7:
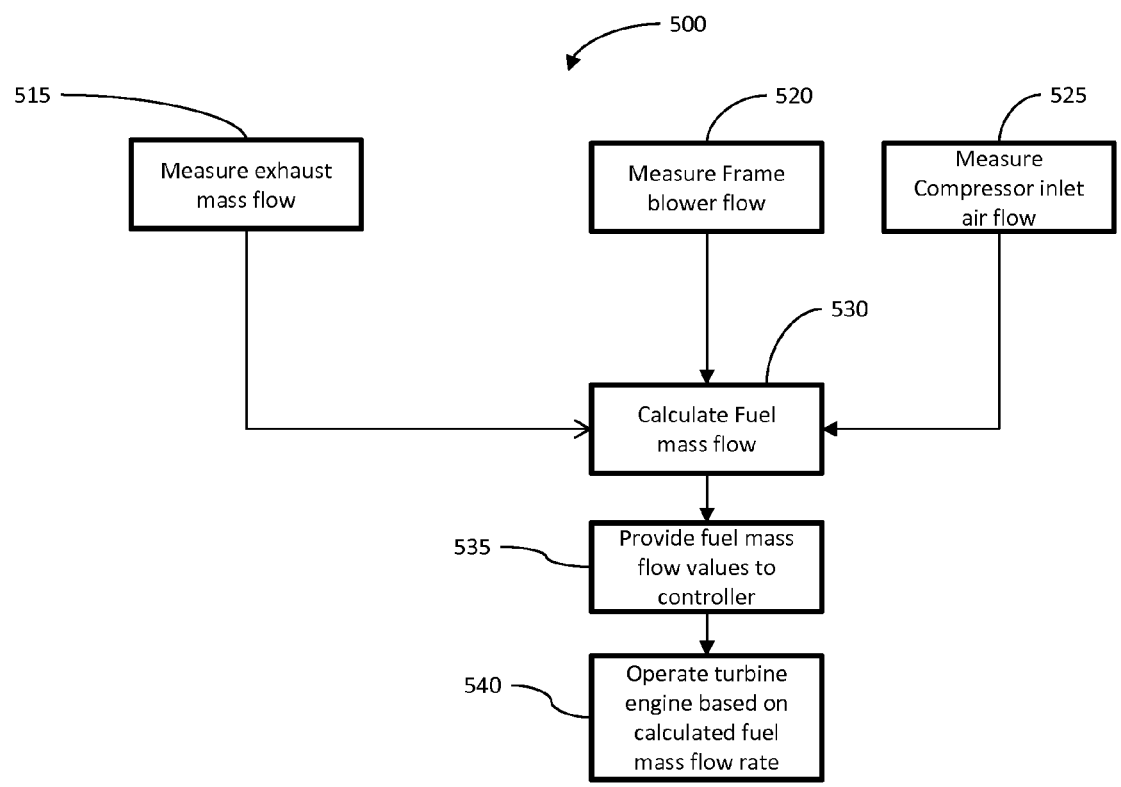
FIG. 7 is a flow diagram of an exemplary method for operating a turbine engine based on calculated fuel mass flow rate.

Illustrated in FIG. 7 is a flow chart for a method 500 for operating a turbine engine based on calculated fuel mass flow rate.

In step 515, the method 500 calculates the average exhaust mass flow.

In step 520, the method 500 measures the main blower flow.

In step 525, the method 500 measures the compressor inlet airflow.

In step 530, the method 500 calculates the fuel mass flow from the average exhaust mass flow, the compressor inlet airflow, and the frame blower airflow.

In step 535, the method 500 provides the fuel mass flow values to the turbine engine control system 365.

In step 540, the method 500 operates the turbine based on the calculated fuel mass flow rate.

Figure 8:
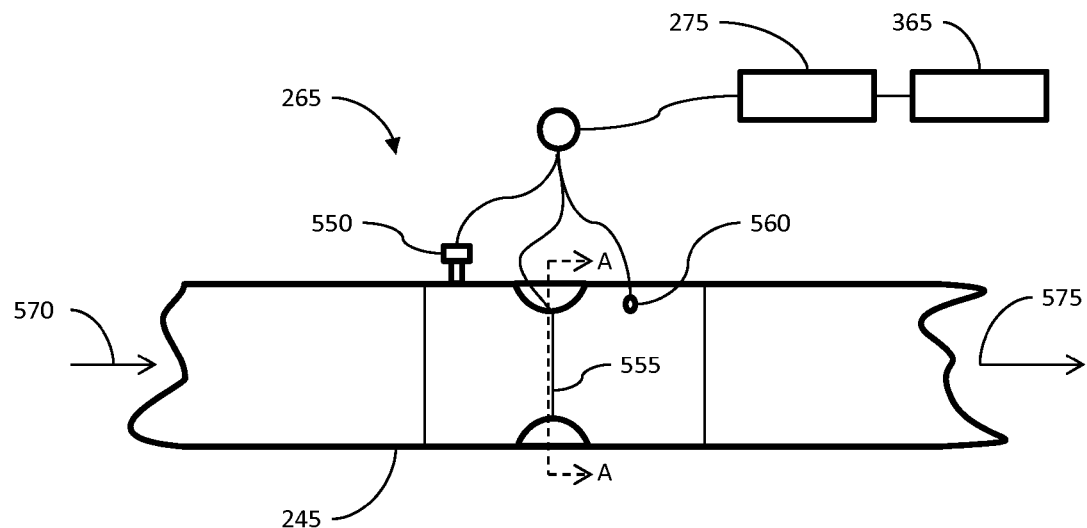
FIG. 8 is a schematic illustration of an embodiment of an extraction flow profile measurement system.
Figure 9:
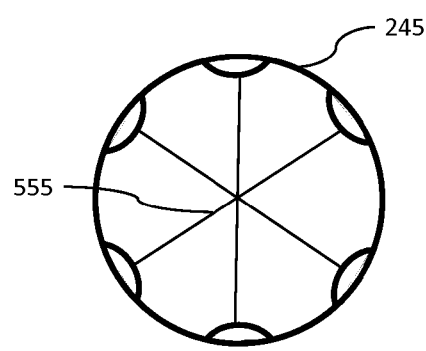
FIG. 9 is a cross section across section AA in FIG. 9.
Figure 10:
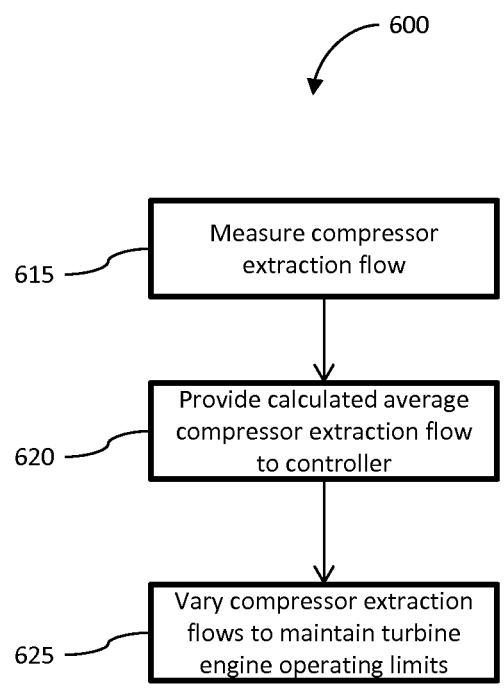
FIG. 10 is a flow diagram of an exemplary method for operating a turbine engine based on calculated extraction mass flow.

Illustrated in FIG. 8 is an extraction flow profile measurement system 265, and illustrated in FIG. 9 is a cross section along lines AA in FIG. 8. The extraction flow profile measurement system 265 includes a hot wire mass flow sensor grid 555, and may include a thermocouple 560 a pressure transducer 550 and flow profile measurement system 275. The extraction flow profile measurement system 265 measures the flow profile of air flow (denoted by arrow 570) flowing through an extraction conduit 245. Airflow (denoted by arrow 570) is extracted from the compressor 205 (shown in FIG. 1) and may be conveyed (as denoted by arrow 575) to the turbine 215 (shown in FIG. 1). The flow profile measurement system 275 may calculate an average compressor extraction mass flow rate that may then be communicated to a turbine engine control system 365. The calculated average compressor extraction mass flow rate provides the ability to actively control the level of compressor extraction mass flow rate, via a metering device such as a valve located in the compressor extraction system, to predefined operating limits within the turbine engine. The ability to actively control the overall compressor extraction system to operational limits provides numerous performance and maintainability benefits to the combustion engine system. These benefits include cooling flow optimization for performance capability; cooling flow optimization for emissions compliance; cooling flow optimization for improved part-life management; and the ability to control margin to compressor surge or stall.

FIG. 8 shows a flowchart for a method 600 for varying extraction flows to maintain turbine engine operating limits based on the flow profile in an extraction conduit 245.

In step 615, the method 600 calculates an average compressor extraction flow.

In step 620, the method 600 provides the calculated average compressor extraction flow value to the turbine engine control system 365.

In step 625, the method 600 varies the compressor extraction flows to maintain turbine engine operating limits.

The terminology used herein is for the purpose of describing particular embodiments only and is not intended to be limiting of the invention. Where the definition of terms departs from the commonly used meaning of the term, applicant intends to utilize the definitions provided herein, unless specifically indicated. The singular forms "a", "an" and "the" intended to include the plural forms as well, unless the context clearly indicates otherwise. It will be understood that, although the terms first, second, etc. may be used to describe various elements, these elements should not be limited by these terms. These terms are only used to distinguish one element from another. The term "and/or" includes any, and all, combinations of one or more of the associated listed items. The phrases "coupled to" and "coupled with" contemplates direct or indirect coupling. For all of the embodiments described above, the steps of the methods need not be performed sequentially.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements.

What is claimed:

1. A method for measuring a flow profile in a portion of a flow path of a turbine engine, wherein the flow path is a compressor inlet flow path; the method comprising;

sensing a physical change in a plurality of hot wire mass flow sensors disposed in the portion of the flow path of the turbine engine, wherein the mass flow sensor assembly comprises at least one of a rake with a plurality of flow passages therethrough and wherein the plurality of hot wire mass flow sensors are distributed throughout the flow passages of the rake and comprises a grid defined by a plurality of intersecting diametric segments in the compressor inlet flow path where the intersecting diametric segments intersect near a center of the compressor inlet flow path on which the plurality of hot wire mass flow sensors are disposed, the physical change being related to a flow attribute at each of a plurality of locations in the portion of the flow path; and converting signals from the plurality of wires into a flow profile measurement, and the method further comprises:

calculating an average compressor inlet mass flow from the flow profile measurement;

providing a value for the average compressor inlet mass flow to a controller; and operating the turbine engine based on the value for the average compressor inlet mass flow.

2. The method of claim 1, wherein the flow profile measurement comprises a velocity flow profile.

3. The method of claim 1, wherein the flow profile measurement comprises a mass flow profile.

4. The method of claim 1, wherein the portion of the flow path comprises one portion of the flow path selected from among a group consisting of an inlet plenum; an exhaust conduit and a compressor extraction conduit.

5. The method of claim 1 wherein the flow path is an exhaust flow path and the method further comprises:
calculating an average exhaust mass flow from the flow profile measurement;
calculating a fuel mass flow; and
operating the turbine engine based on the fuel mass flow.

6. The method of claim 1 wherein the flow path is a compressor extraction conduit, and the method further comprises:
calculating an average compressor extraction flow from the flow profile measurement; and
varying compressor extraction flows to maintain turbine engine operating limits.

7. A system for measuring a gas mass flow in a portion of a flow path in a turbine engine, wherein the flow path is a compressor inlet flow path, the system comprising:
an mass flow sensor assembly having a plurality of hot wire mass flow sensors, the mass flow sensor assembly disposed in the portion of the flow path at a location where a flow profile is to be measured, wherein the mass flow sensor assembly comprises a rake with a plurality of flow passages therethrough and wherein the plurality of hot wire mass flow sensors is distributed throughout the flow passages of the rake; and
a controller that converts signals from the plurality of hot wire mass flow sensors to mass flow measurements; and
the controller further calculates an average compressor inlet mass flow from the flow profile measurement;
provides a value for the average compressor inlet mass flow to a controller; and
operates the turbine engine based on the value for the average compressor inlet mass flow.

8. A system for measuring a gas mass flow in a portion of a flow path in a turbine engine, wherein the flow path is a compressor inlet flow path, the system comprising:
an mass flow sensor assembly having a plurality of hot wire mass flow sensors, the mass flow sensor assembly disposed in the portion of the flow path at a location where a flow profile is to be measured, wherein the mass flow sensor assembly comprises a grid defined by a plurality of intersecting diametric segments in the compressor inlet flow path where the intersecting diametric segments intersect near a center of the compressor inlet flow path on which the plurality of hot wire mass flow sensors are disposed; and
a controller that converts signals from the plurality of hot wire mass flow sensors to mass flow measurements; and
the controller further calculates an average compressor inlet mass flow from the flow profile measurement;
provides a value for the average compressor inlet mass flow to a controller; and
operates the turbine engine based on the value for the average compressor inlet mass flow.

9. The system for measuring a gas mass flow of claim 7, wherein the flow profile is a mass flow profile.

10. The system for measuring a gas mass flow of claim 7, wherein the flow profile is a velocity flow profile.

11. The system for measuring a gas mass flow of claim 7, wherein the gas mass flow comprises an air flow.

12. The system for measuring a gas mass flow of claim 7, wherein the portion of the flow path comprises one portion of the flow path selected from among a group consisting of an inlet plenum; an exhaust conduit and a compressor extraction conduit.

13. A turbine engine comprising:
a compressor;
a combustor;
a turbine;
wherein the compressor, the combustor and the turbine define a flow path;
a mass flow sensor assembly disposed in a portion of the flow path, the mass flow sensor assembly comprising a plurality of hot wire mass flow sensors disposed on the mass flow sensor assembly, wherein the mass flow sensor assembly comprises at least one of a rake with a plurality of flow passages therethrough and wherein the plurality of hot wire mass flow sensors are distributed throughout the flow passages of the rake and comprises a arid defined by a plurality of intersecting diametric segments in the compressor inlet flow path where the intersecting diametric segments intersect near a center of the compressor inlet flow path on which the plurality of hot wire mass flow sensors are disposed; and
a controller that converts signals from the plurality of hot wire mass flow sensors to flow profile measurements; and
the controller further calculates an average compressor inlet mass flow from the flow profile measurement;
provides a value for the average compressor inlet mass flow to a controller; and
operates the turbine engine based on the value for the average compressor inlet mass flow.

14. The turbine engine of claim 13, wherein the mass flow sensor assembly comprises a rake, and the plurality of hot wire mass flow sensors are distributed on the rake.

15. The turbine engine of claim 13, wherein the mass flow sensor assembly comprises a grid of hot wire mass flow sensors.

16. The turbine engine of claim 13, wherein the portion of the flow path comprises one portion of the flow path selected from among a group consisting of an inlet plenum; an exhaust conduit and a compressor extraction conduit.

17. The turbine engine of claim 13, wherein the flow profile measurements comprise mass flow profile measurements.

18. The turbine engine of claim 13, wherein the flow profile measurements comprise velocity flow profile measurements.

* * * * *